US008089639B2

(12) United States Patent  (10) Patent No.: US 8,089,639 B2
Kimakura  (45) Date of Patent: Jan. 3, 2012

(54) IMAGE FORMING APPARATUS WITH IMAGE DENSITY CHANGE PORTION FOR GRADUALLY REDUCING IMAGE DENSITY FROM AN OUTER PERIPHERY OF A CHARACTER TOWARD AN INSIDE

(75) Inventor: Yoshitaka Kimakura, Osaka (JP)

(73) Assignee: Kyocera Mita Corporation (JP)

( * ) Notice: Subject to any disclaimer, the term of this patent is extended or adjusted under 35 U.S.C. 154(b) by 1317 days.

(21) Appl. No.: 11/728,476

(22) Filed: Mar. 26, 2007

(65) Prior Publication Data

US 2008/0018937 A1  Jan. 24, 2008

(30) Foreign Application Priority Data

May 31, 2006 (JP) .................................. 2006-150894

(51) Int. Cl.
 *G06K 15/02* (2006.01)
 *H04N 1/40* (2006.01)
(52) U.S. Cl. ....... 358/1.11; 358/2.1; 358/3.27; 358/532; 382/162; 382/176; 382/199; 382/254
(58) Field of Classification Search .................. 358/2.1, 358/3.1, 3.15, 3.27, 1.11, 532; 382/258, 382/162, 176, 199, 254, 260–264, 266, 269, 382/274
See application file for complete search history.

(56) References Cited

U.S. PATENT DOCUMENTS

| 4,893,188 A * | 1/1990 | Murakami et al. ............. 358/2.1 |
| 5,201,032 A * | 4/1993 | Kurose ........................... 345/170 |
| 5,563,713 A * | 10/1996 | Sugiura .......................... 382/256 |
| 5,689,582 A * | 11/1997 | Murakami ..................... 382/176 |
| 5,754,708 A * | 5/1998 | Hayashi et al. ................ 382/266 |
| 6,504,949 B2 * | 1/2003 | Matsukubo et al. .......... 382/162 |
| 6,791,714 B1 * | 9/2004 | Ishimura ......................... 358/1.9 |
| 7,085,013 B2 * | 8/2006 | Yamakawa ..................... 358/2.1 |

(Continued)

FOREIGN PATENT DOCUMENTS

JP 3-64251 3/1991

(Continued)

OTHER PUBLICATIONS

Nakayama Hiromichi, Image processing method and image processor, Aug. 8, 2003, JP 2003-224718 English Translation.*

(Continued)

*Primary Examiner* — Charlotte M Baker
*Assistant Examiner* — Dennis Dicker
(74) *Attorney, Agent, or Firm* — Gerald E. Hespos; Michael J. Porco (57) ABSTRACT

An image forming apparatus has an image acquisition portion that acquires image data on an image including a character. A character-periphery detector detects the peripheral part of the character in the image data acquired by the image acquisition portion. An outline emphasis portion sets the density of the image data acquired by the image acquisition portion, so that the density of the peripheral part of the character detected by the character-periphery detector becomes higher than the density indicated by this image data. A density changer sets the density of the image data so that this density gradually becomes lower from the peripheral part of the character detected by the character-periphery detector toward the inside thereof. An image former forms an image on a sheet of recording paper on the basis of the image data whose density is set by the outline emphasis portion and the density changer.

8 Claims, 8 Drawing Sheets

U.S. PATENT DOCUMENTS

| | | | |
|---|---|---|---|
| 7,206,446 B2* | 4/2007 | Sawada | 382/167 |
| 7,408,672 B2* | 8/2008 | Ito | 358/1.2 |
| 7,463,785 B2* | 12/2008 | Ebisawa | 382/266 |
| 7,508,541 B2* | 3/2009 | Ishiguro | 358/1.9 |
| 2005/0265624 A1* | 12/2005 | Washio | 382/273 |

FOREIGN PATENT DOCUMENTS

| | | |
|---|---|---|
| JP | 4-61561 | 2/1992 |
| JP | 4-216268 | 8/1992 |
| JP | 9-85993 | 3/1997 |
| JP | 9-200530 | 7/1997 |
| JP | 2003-224718 | 8/2003 |

OTHER PUBLICATIONS

Hotta Yozo, Image Processing Device and its control, Mar. 31, 1997, JP 09-085993 English Translation.*

* cited by examiner

IMAGE FORMING APPARATUS WITH IMAGE DENSITY CHANGE PORTION FOR GRADUALLY REDUCING IMAGE DENSITY FROM AN OUTER PERIPHERY OF A CHARACTER TOWARD AN INSIDE

BACKGROUND OF THE INVENTION

1. Field of the Invention

The present invention relates to an image forming apparatus, and in particular, an image forming apparatus which is capable of enhancing the visibility of a character.

2. Description of the Related Art

Conventionally, in an image forming apparatus, when an image including a character is formed, a processing is executed for emphasizing the character. It includes increasing the quantity of an ink in its peripheral part, using an image-sharpening filter in a filter processing, reducing the size of a dither in a half-tone processing, or doing such another (e.g., refer to Japanese Patent Laid-Open No. 2003-224718 specification). In such an image forming apparatus, when an image of a character is formed, this character's periphery is emphasized so that the character becomes more visible.

If the above described processing for emphasizing a character is executed, the character's visibility is improved. However, if the character is thick, that can raise a disadvantage in that its peripheral part is only edged, and thus, the character has a difference in its density between the periphery and the inside, thereby making it look unnatural.

SUMMARY OF THE INVENTION

In view of the above described disadvantage, it is an object of the present invention to provide an image forming apparatus which is capable of improving the visibility of a character and restraining it from looking unnatural because of its density difference.

An image forming apparatus according to an aspect of the present invention, comprising: an image acquisition portion which acquires image data on an image including a character; a character-periphery detection portion which detects the peripheral part of the character in the image data acquired by the image acquisition portion; an outline emphasis portion which sets the density of the image data acquired by the image acquisition portion, so that the density of the peripheral part of the character detected by the character-periphery detection portion becomes higher than the density indicated by this image data; a density change portion which sets the density of the image data so that this density gradually becomes lower from the peripheral part of the character detected by the character-periphery detection portion toward the inside thereof; and an image formation portion which forms an image on a sheet of recording paper on the basis of the image data whose density is set by the outline emphasis portion and the density change portion.

In this image forming apparatus, the image acquisition portion acquires image data on an image including a character, and the character-periphery detection portion detects the peripheral part of the character in the image data. Besides, the outline emphasis portion sets the density of the image data, so that the density of the peripheral part of the character detected by the character-periphery detection portion becomes higher. Then, the density change portion sets the density of the image data so that this density gradually becomes lower from the character's peripheral part toward its inside. In addition, on the basis of the image data whose density is set by the outline emphasis portion and the density change portion, the image formation portion forms an image on a sheet of recording paper. Therefore, the character's peripheral-part density becomes higher so that it can be emphasized. At the same time, the character's image density changes so that the density gradually becomes lower from the character's peripheral part toward its inside. This makes it possible to enhance the character's visibility and reduce its unnaturalness because of the density difference.

These and other objects, features and advantages of the present invention will become more apparent upon reading of the following detailed description along with the accompanied drawings.

DETAILED DESCRIPTION OF THE PREFERRED EMBODIMENTS

Figure 1:
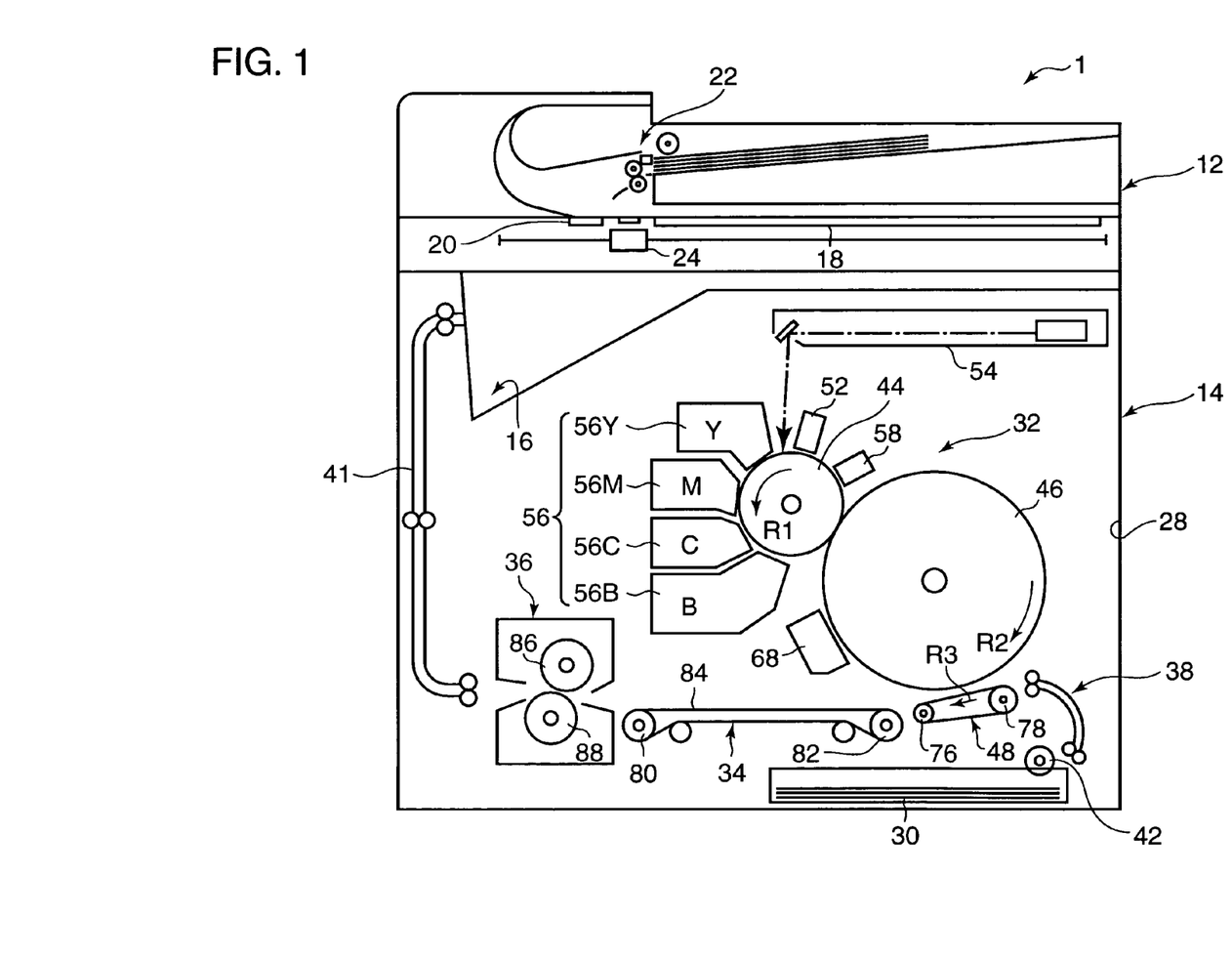
FIG. 1 is a schematic view of an image forming apparatus according to an embodiment of the present invention, showing an example of its configuration.

Hereinafter, an image forming apparatus according to an embodiment of the present invention will be described with reference to the attached drawings. In each figure, component elements are given the same reference numerals and characters as long as they are identical, and their description is omitted. FIG. 1 is a schematic view of the image forming apparatus according to the embodiment of the present invention, showing an example of its configuration. An image forming apparatus 1 shown in FIG. 1 is, for example, a digital-type color copying machine. Incidentally, the present invention can be applied to various image forming apparatus, such as a copying machine, a printer, a facsimile device and a complex machine including some of them.

The image forming apparatus 1 shown in FIG. 1 includes: an image reading portion 12 which reads an image on a sheet of original paper; a main-body portion 14 which transfers the original-paper image read by the image reading portion 12 onto a sheet of recording paper; and a recording-paper discharge portion 16 which discharges the sheet of recording paper with the original-paper image transferred by the main-body portion 14.

The image reading portion 12 is located above the main-body portion 14. The image reading portion 12 includes: a sheet of contact glass 18 which forms a reading area for the sheet of original paper placed statically; a sheet of contact glass 20 which is used as a reading area for the sheet of original paper fed automatically; an automatic original-paper feeding portion 22 which feeds a pile of such original-paper sheets one by one toward the contact glass 20; a scanner 24 (i.e., the image acquisition portion) which is formed by a CCD (or charge coupled device) and the like and reads the original-paper image. Specifically, this image reading portion 12 reads the image of the sheet of original paper placed on the contact glass 18, using the scanner 24. On the other hand, it reads the image of the sheet of original paper which is sent out by the automatic original-paper feeding portion 22 and passes over the contact glass 20. Incidentally, the scanner 24 not necessarily has to be provided. For example, in the case of a printer, a communication interface circuit which receives image data from a terminal unit such as a personal computer connected via a network corresponds to an example of the image acquisition portion.

The main-body portion 14 includes: a paper supply cassette 30 provided in the lower part inside of a case body 28; an image formation portion 32 provided in the middle part of the case body 28; a recording-paper forwarding portion 34 provided below the image formation portion 32 inside of the case body 28; a fixing unit 36 provided on the downstream side of the recording-paper forwarding portion 34 inside of the case body 28; a first forwarding path 38 for sending out a sheet of recording paper delivered from the paper supply cassette 30 to the side of the image formation portion 32; and a second forwarding path 41 for discharging the sheet of recording paper which has passed through the fixing unit 36 to the recording-paper discharge portion 16.

The paper supply cassette 30 is designed so that sheets of recording paper P piled inside are delivered one at a time to the side of the first forwarding path 38 by a paper supply roller 42.

The image formation portion 32 transfers the original-paper image read by the image reading portion 12 onto a sheet of recording paper. Then, the image formation portion 32 includes: a photosensitive drum 44 which rotates counter-clockwise, as shown by an arrow R1 in FIG. 1, to form a toner image on its peripheral surface; an intermediate transfer drum 46 which rotates clockwise, as shown by an arrow R2 in FIG. 1, to transfer the toner image formed on the photosensitive drum 44 onto its peripheral surface; and a transfer belt 48 which is provided below the intermediate transfer drum 46 and transfers the toner image transferred on the intermediate transfer drum 46 onto a sheet of recording paper forwarded from the first forwarding path 38.

To the transfer belt 48, a bias voltage is supplied which has a positive electric potential. This makes it easy to transfer the toner image transferred on the intermediate transfer drum 46 onto a sheet of recording paper. In this way, the positive-potential bias voltage is supplied to the transfer belt 48, so that the recording paper is electrified with a positive charge when the toner image is transferred or at another such time.

Around the photosensitive drum 44, a charging portion 52 is provided so as to face the photosensitive drum 44's peripheral surface. Then, an exposure portion 54 is provided which irradiates, with a laser beam, an area of the photosensitive drum 44 on the downstream side of the charging portion 52. On the downstream side of the exposure portion 54, a development portion 56 is provided so as to face the photosensitive drum 44's peripheral surface. Then, on the downstream side of the development portion 56, a cleaning portion 58 is provided so as to face the photosensitive drum 44's peripheral surface.

The development portion 56 is made up of: a development portion 56Y which forms a toner image with yellow (Y); a development portion 56M which forms a toner image with magenta (M); a development portion 56C which forms a toner image with cyan (C); and a development portion 56B which forms a toner image with black (B). In this order, they are disposed from the upstream side to the downstream side on the photosensitive drum 44's peripheral surface.

Around the intermediate transfer drum 46, a cleaning portion 68 is provided so as to face the intermediate transfer drum 46's peripheral surface on the downstream side of the transfer belt 48. The transfer belt 48 is attached to a driving roller 76 and a driven roller 78 so as to bridge them. The transfer belt 48 conveys, in the direction of an arrow R3, the recording paper which it has received from the first forwarding path 38. Then, it passes the recording paper to the recording-paper forwarding portion 34.

The recording-paper forwarding portion 34 forwards the recording paper which it has received from the transfer belt 48 toward the side of the fixing unit 36. It is formed by making a mesh forwarding belt 84 bridge a driving roller 80 and a driven roller 82. A vacuum suction portion (not shown) is provided behind this mesh forwarding belt 84. Thus, the mesh forwarding belt 84 conveys the recording paper sucked in a vacuum and passes it to the fixing unit 36.

The fixing unit 36 executes a fixing processing by heating the recording paper on which the toner image is transferred. The fixing unit 36 includes a fixing roller 86 which has a heater inside, and a pressure roller 88 which is disposed by pressing and coming into contact with the fixing roller 86.

The image forming apparatus 1 configured as described so far operates in the following way. Specifically, a sheet of original paper is placed on the contact glass 18, or the original paper is placed on the automatic original-paper feeding portion 22. When a start button (not shown) is operated, the original paper's image is retrieved by the scanner 24. Then, its image data is subjected to a predetermined image processing and transmitted to the image formation portion 32.

In the photosensitive drum 44 of the image formation portion 32, the photosensitive drum 44 rotates so that an electrostatic area is formed on its surface by the charging portion 52. This electrostatic area is exposed to a laser beam from the exposure portion 54, and thus, an electrostatic latent image is formed based on the image data transmitted from the image reading portion 12. Thereafter, for example, a yellow toner image is formed by the development portion 56Y. This yellow toner image is transferred to the intermediate transfer drum 46 which rotates synchronously with the photosensitive drum 44. In the same way, on the photosensitive drum 44, a toner image with each color is formed one after another by the development portion 56M, 56C, 56B, respectively. Each toner image is transferred on top of one another to the intermediate transfer drum 46.

This toner image transferred on top of one another to the intermediate transfer drum 46 is transferred to a sheet of recording paper which is forwarded onto the transfer belt 48 synchronously with the intermediate transfer drum 46. In this way, a toner image is formed on the recording paper. This toner image is transferred to the recording paper by supplying a positive-potential bias voltage from the reverse-surface side of the transfer belt 48 so that the toner image on the intermediate transfer drum 46 can be drawn toward the side of the recording paper. At this time, the recording paper is electrified with a positive charge, using the bias voltage supplied to the transfer belt 48.

This recording paper with the transferred toner image is passed to the recording-paper forwarding portion 34 by the transfer belt 48. Specifically, the positive charge of the electrified recording paper at the time when the recording paper passes under the intermediate transfer drum 46 is drawn toward the intermediate transfer drum 46 and discharged. As a result, the recording paper is easily peeled from the intermediate transfer drum 46 toward the transfer belt 48. Hence, it can be smoothly passed from the transfer belt 48 to the recording-paper forwarding portion 34. The recording paper passed to the recording-paper forwarding portion 34 is sucked in a vacuum, and in this state, it is conveyed to the side of the fixing unit 36. Then, it is heated by the fixing roller 86, and simultaneously, it is sandwiched between the fixing roller 86 and the pressure roller 88 and is forwarded to the downstream side. Thus, it is discharged through the second forwarding path 41 to the recording-paper discharge portion 16.

After the toner image is transferred to the intermediate transfer drum 46, the photosensitive drum 44 has a residual toner on its surface, which is removed by the cleaning portion 58. Similarly, the intermediate transfer drum 46 has a residual toner on its surface after the toner image is transferred to the transfer belt 48. It is also removed by the cleaning portion 58.

Figure 2:
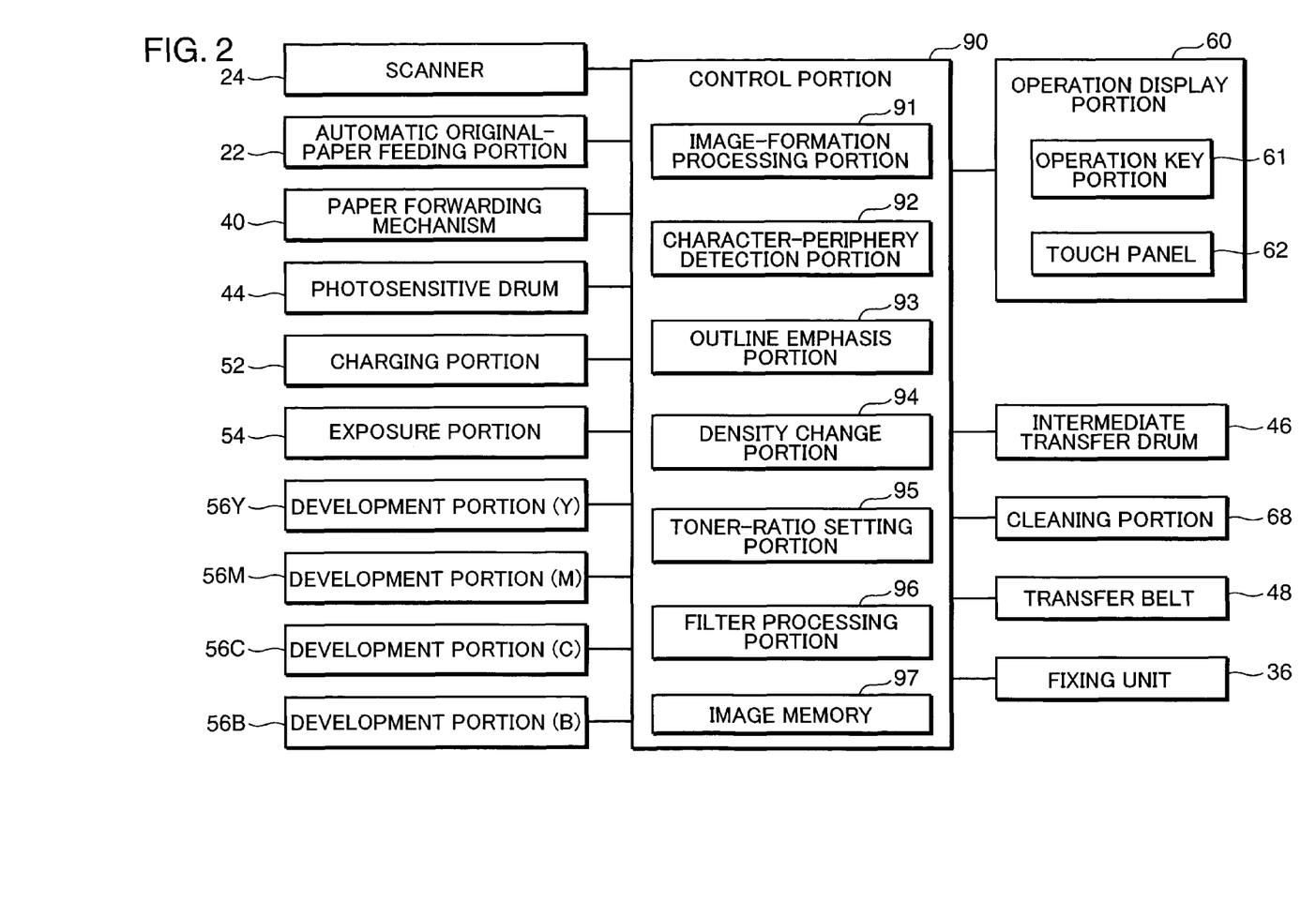
FIG. 2 is a block diagram, showing a schematic electrical configuration of the image forming apparatus shown in FIG. 1.

FIG. 2 is a block diagram, showing a schematic electrical configuration of the image forming apparatus 1. In the image forming apparatus 1, each portion inside of it is connected to a control portion 90. In response to a control signal from the control portion 90, each portion operates so that the entire image forming apparatus 1 can be controlled.

In FIG. 2, a paper forwarding mechanism 40 indicates a forwarding mechanism which forwards a sheet of recording paper from the paper supply cassette 30 to the recording-paper discharge portion 16, such as the paper supply roller 42, the first forwarding path 38, the recording-paper forwarding portion 34 and the second forwarding path 41.

An operation display portion 60 includes an operation key portion 61 which is formed by a key switch, such as a start key for a user inputting a printing execution instruction and a ten key for inputting the number of prints or the like; and a touch panel 62 which includes a liquid crystal display or the like, and displays operation-guide information or the like for inputting the setting or the like of various copying operations and displays various operation buttons or the like. This operation display portion 60 displays a picture on the touch panel 62 according to the control signal from the control portion 90. Or, using the operation key portion 61 and the touch panel 62, it accepts an instruction input which corresponds to the user's operation. Then, it outputs a signal indicating this instruction input to the control portion 90.

The control portion 90 includes, for example: a CPU (or central processing unit) which executes a predetermined arithmetic processing; an ROM (or read only memory) which has a predetermined control program stored therein; an RAM (or random access memory) which stores data temporarily; their peripheral circuits; and the like. This control portion 90 executes the control program stored in the ROM, so that it functions as an image-formation processing portion 91, a character-periphery detection portion 92, an outline emphasis portion 93, a density change portion 94, a toner-ratio setting portion 95, and a filter processing portion 96. The RAM is used as an image memory 97 which stores image data temporarily.

The character-periphery detection portion 92 detects the peripheral part of a character in the image data acquired by the scanner 24. This is accomplished by a publicly-known art which uses a property, or the fact that if the image data's part whose density is sharply changed undergoes differential filtering, its edge will be raised. This publicly-known art is disclosed, as an example, in Japanese Patent Laid-Open No. 3-64251 specification.

The outline emphasis portion 93 sets the density of the image data so that the density of the peripheral part of the character detected by the character-periphery detection portion 92 becomes higher. The density change portion 94 sets the density of the image data so that this density gradually becomes lower from the peripheral part of the character detected by the character-periphery detection portion 92 toward the inside thereof.

The toner-ratio setting portion 95 sets the ratio of each colored toner, in terms of the image data whose density is set by the outline emphasis portion 93 and the density change portion 94, so that the ratio of a black toner decreases gradually from the peripheral part of the character detected by the character-periphery detection portion 92 toward the inside thereof.

The filter processing portion 96 executes, for example, a smoothing processing for the area of the image data other than the character's peripheral part, so that a noise or a moire can be removed. The image-formation processing portion 91 controls the operation of each portion. On the basis of the image data whose density is set by the outline emphasis portion 93 and the density change portion 94, it forms an image on a sheet of recording paper, using the image formation portion 32 such as the photosensitive drum 44.

Figure 3:
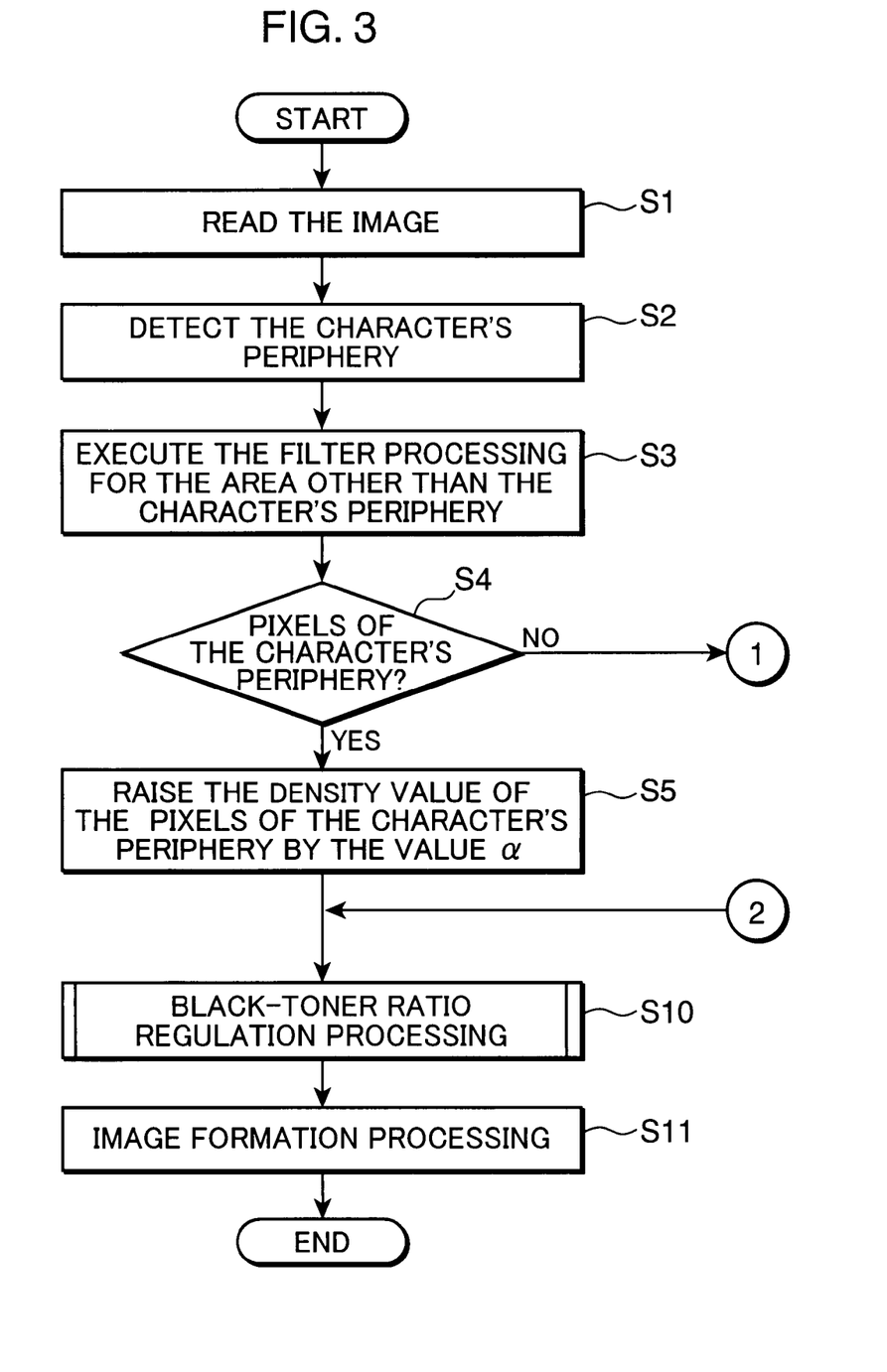
FIG. 3 is a flow chart, showing an example of the operation of the image forming apparatus shown in FIG. 2.
Figure 4:
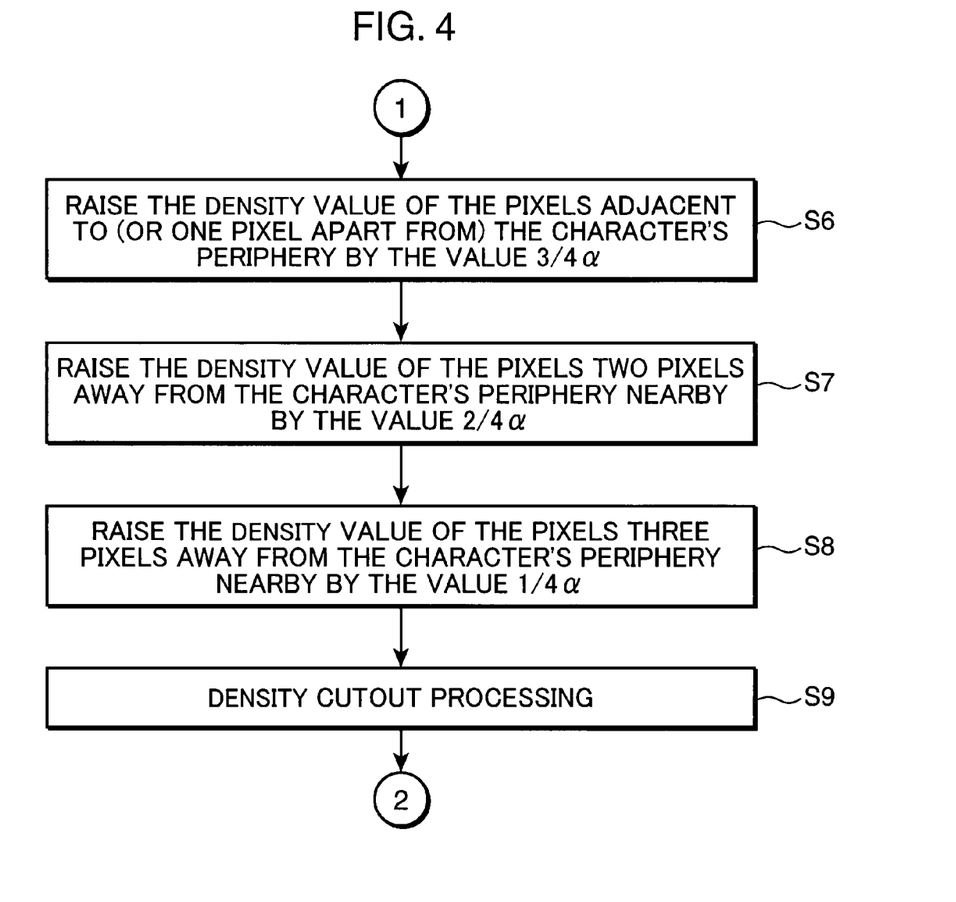
FIG. 4 is a flow chart, showing an example of the operation of the image forming apparatus shown in FIG. 2.
Figure 5:
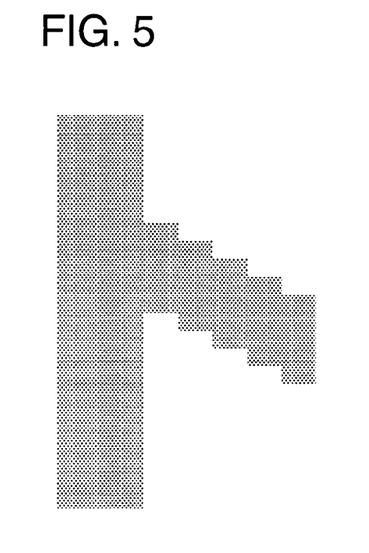
FIG. 5 is an illustration, showing an example of the image read by a scanner shown in FIG. 2.

Next, an operation will be described of the image forming apparatus 1 configured as described so far. FIG. 3, FIG. 4 are flow charts, showing an example of the operation of the image forming apparatus 1. First, for example, a user operates the operation key portion 61 and gives an instruction for a copying operation. Then, the image of a sheet of original paper placed on the contact glass 18 is read by the scanner 24. It is stored, for example, in the image memory 97 (in a step S1). For example, if the image of the original paper is "ト", or a gray "katakana" character on the Japanese syllabary, then as shown in FIG. 5, image data on the image expressing this gray "ト" is stored in the image memory 97. In this case, a signal outputted from the scanner 24 expresses each pixel, for example, using three colors of R (or red), G (or green) and B (or blue). These are transformed into Y (yellow), M (magenta) and C (cyan) used in the image formation portion 32, so that the image data is generated. Besides, the density of each color of the image data is indicated, for example, using a density value of 0 to 255. The greater this density value becomes, the higher density it indicates.

Figure 6:
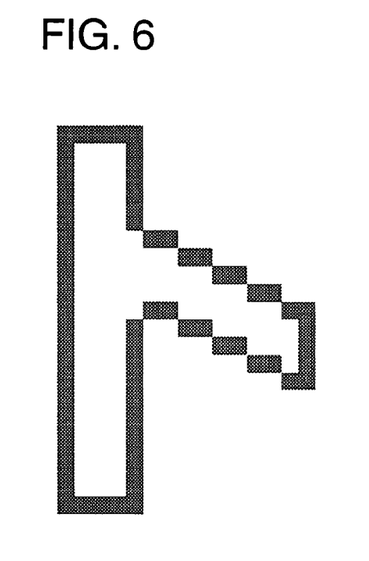
FIG. 6 is an illustration, showing an example of the operation of a character-periphery detection portion shown in FIG. 2.

Sequentially, from the image data stored in the image memory 97, the peripheral part of the character is detected by the character-periphery detection portion 92. As shown in FIG. 6, for example, periphery date on the character's peripheral part is produced and stored in the image memory 97 (in a step S2). Then, the filter processing portion 96 executes, for example, a smoothing processing for the area other than the character's peripheral part indicated by the piece of periphery date among the pieces of image data stored in the image memory 97. Thereby, a noise or a moire can be eliminated (in a step S3).

Figure 7:
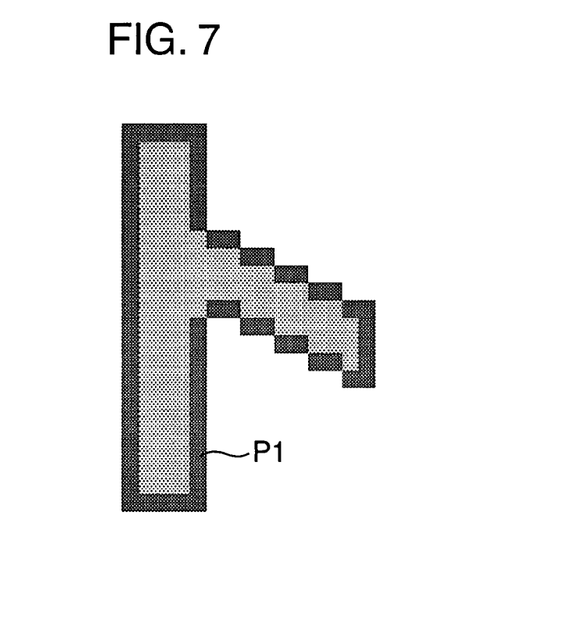
FIG. 7 is an illustration, showing an example of the operation of an outline emphasis portion shown in FIG. 2.

Next, among the pixels of the image data stored in the image memory 97, in terms of the pixels of the character's peripheral part indicated by the periphery date (YES at a step S4), the outline emphasis portion 93 raises the density value by a predetermined value α, for example, a value of 20. As shown in FIG. 7, the character's outline is emphasized (in a step S5), and then, the processing goes ahead to a step S10. In this case, for example, if the density value of each pixel of the image shown in FIG. 5 is, for example, Y:125, M:125, C:125, then the outline emphasis portion 93 sets the density value of pixels P1 in the character's peripheral part, for example, to Y:145, M:145, C:145.

Figure 8:
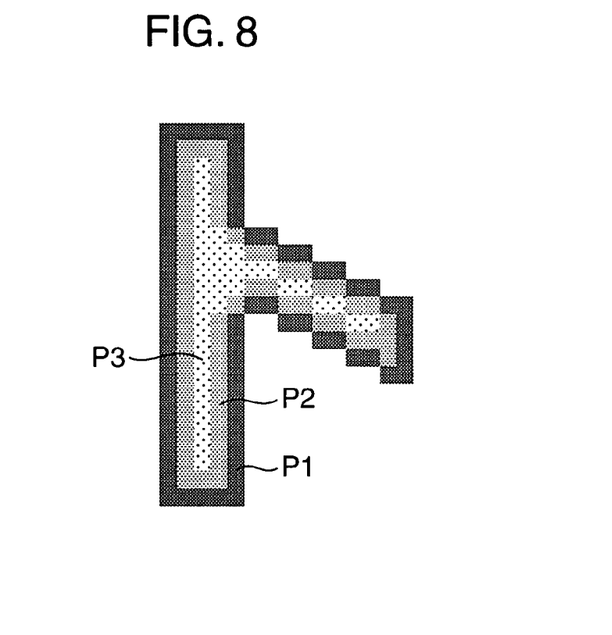
FIG. 8 is an illustration, showing an example of the operation of a density change portion shown in FIG. 2.

On the other hand, among the pixels of the image data stored in the image memory 97, in terms of the pixels other than those of the character's peripheral part indicated by the periphery date (NO at the step S4), the density change portion 94 increases, by ¾α or 15, the density value of the pixels adjacent to the character's peripheral part, in other words, the pixels in the position a distance of one pixel apart from the character's peripheral part. Hence, it becomes, for example, Y:140, M:140, C:140 (in a step S6). Consequently, as shown in FIG. 8, the density of pixels P2 adjacent to the character's peripheral part becomes higher than the density of the original image stored in the image memory 97. This density is supposed to be lower than the character's peripheral part.

Sequentially, the density change portion 94 increases, by ²⁄₄α or 10, the density value of pixels P3 in the position a distance of two pixels away from the character's peripheral part nearby. Hence, it becomes, for example, Y:135, M:135, C:135 (in a step S7). As a result, as shown in FIG. 8, the density of the pixels P3 in the position a distance of two pixels away from the character's peripheral part becomes higher than the density of the original image stored in the image memory 97. This density is supposed to be lower than that of the pixels P2, so that the density gradually becomes lower inward from the character's peripheral part.

Next, the density change portion 94 increases, by ¼α or 5, the density value of pixels P4 in the position a distance of three pixels apart from the character's peripheral part nearby. Hence, it becomes, for example, Y:130, M:130, C:130 (in a step S8). In FIG. 8, the position a three-pixel distance away from the peripheral part on one side corresponds to the position adjacent to the peripheral part on the other side. Hence, there are no such pixels P4 in the position a distance of three pixels apart from the character's peripheral part nearby. Therefore, without executing the processing for increasing the density value of the pixels P4 by ¼α, the processing shifts to a step S9.

In addition, for example, in the case of an extremely thick character, pixels may lie in the position a distance of four or more pixels away from the character's peripheral part nearby. However, in such a case, if the density is continuously changed, then the gradation becomes too conspicuous, resulting in an unnatural image. Even in this case, however, only within the range from the peripheral part of a character up to the position a distance of three pixels away from there, the density is gradually changed. This restrains its image from being unnatural because of a continuous density change.

Incidentally, an example is given in which the density change portion 94 changes the density gradually within the range from the peripheral part of a character up to the position a distance of three pixels away from there. However, the number of pixels within the range where the density is changed is not limited to three. One or two pixels may also be set, or four or more pixels can also be suitably set.

Next, in the step S9, a density cutout processing is executed. The pixels whose density values are below a predetermined threshold value, for example, twenty, is returned, for example, to the image density acquired by the scanner 24. Or, they are turned into a background color set in advance, for example, white (whose density value is zero). In the steps S6, S7, S8, likewise in the pixels outside of the peripheral part of a character, their density becomes higher in the steps S6, S7, S8. However, in the density cutout processing of the step S9, the density outside of the character is returned, for example, to the image density acquired by the scanner 24. Or, they are changed into a background color set beforehand, for example, white (whose density value is zero). Incidentally, for example, the area surrounded with data on the periphery, a higher one of both sides of the character's peripheral part, or the like, may also be recognized to be the character's inside. Then, the processing of the steps S6, S7, S8 is executed only on the character's inside.

Sequentially, in the step S10, the toner-ratio setting portion 95 sets the ratio of a black toner. The signal outputted from the scanner 24 expresses the image with the three colors of R, G, B. Hence, the image data generated from this signal is designed to express the image with the three colors of C, M, Y. But, the development portion 56 forms the image with the four colored toners of C, M, Y, B. Thus, an image data which expresses the image needs to be produced using the four colors of C, M, Y, B, by replacing a part of C, M, Y with B (or black). At this time, if it is achromatic, in other words, if the densities of C, M, Y are the same, they can be replaced with the single color B. For example, if the character is a fine-stroke black (or gray), then no question will arise even if its image is formed using the single color B. However, if an image of a thick character including many non-segmented image parts is formed using the black toner alone, then the image becomes dry and brittle, and its quality looks poor.

Accordingly, the toner-ratio setting portion 95 sets the ratio of each colored toner, in terms of the image data whose density is set by the outline emphasis portion 93 and the density change portion 94, so that the ratio of the black toner to the toners of cyan, magenta and yellow decreases gradually from the peripheral part of the character detected by the character-periphery detection portion 92 toward the inside thereof. This helps change the black toner's ratio smoothly and keep the image's quality from lowering.

Figure 9:
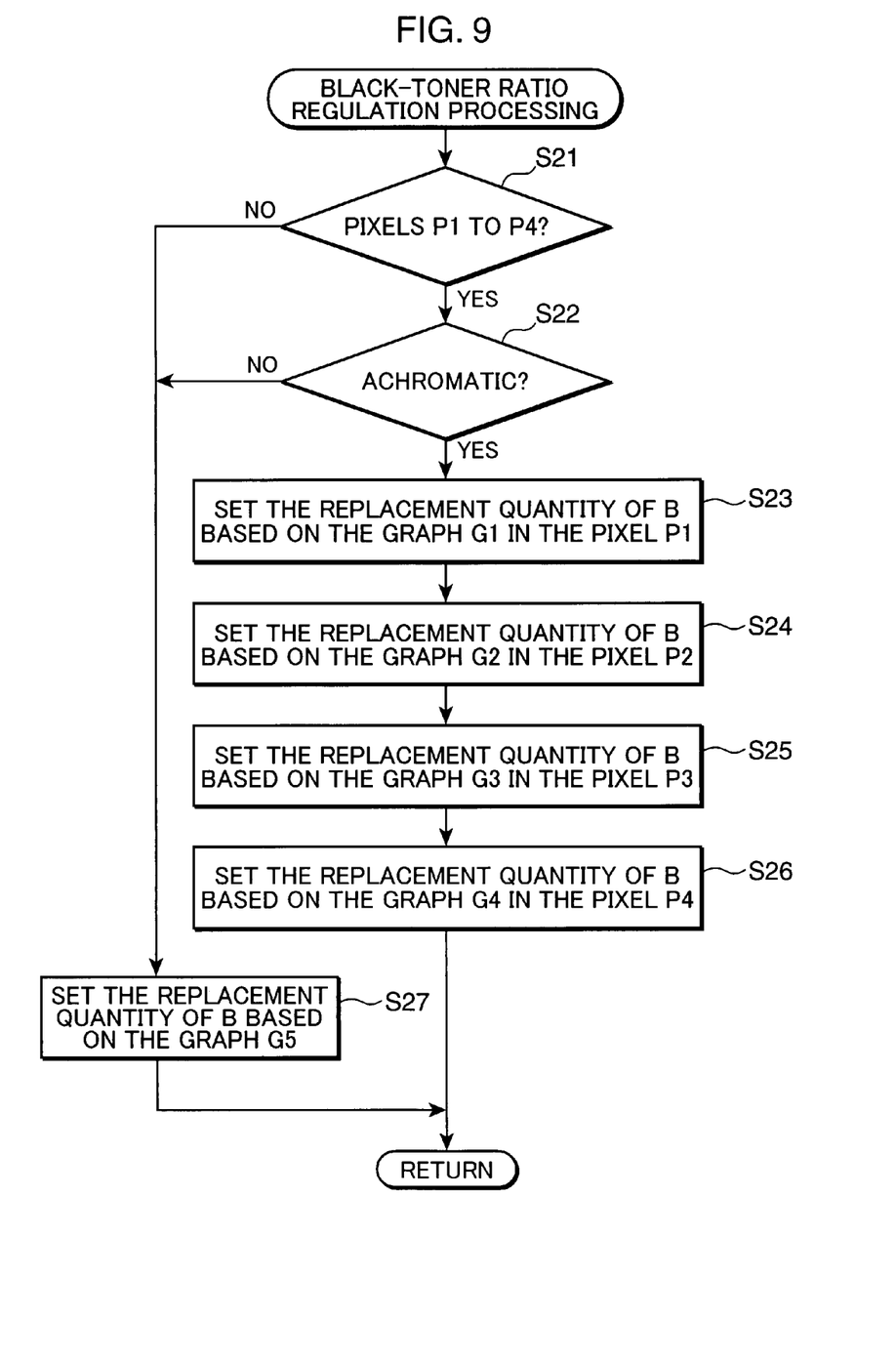
FIG. 9 is a flow chart, showing an example of the processing for regulating the ratio of a black toner using a toner-ratio setting portion shown in FIG. 2.
Figure 10:
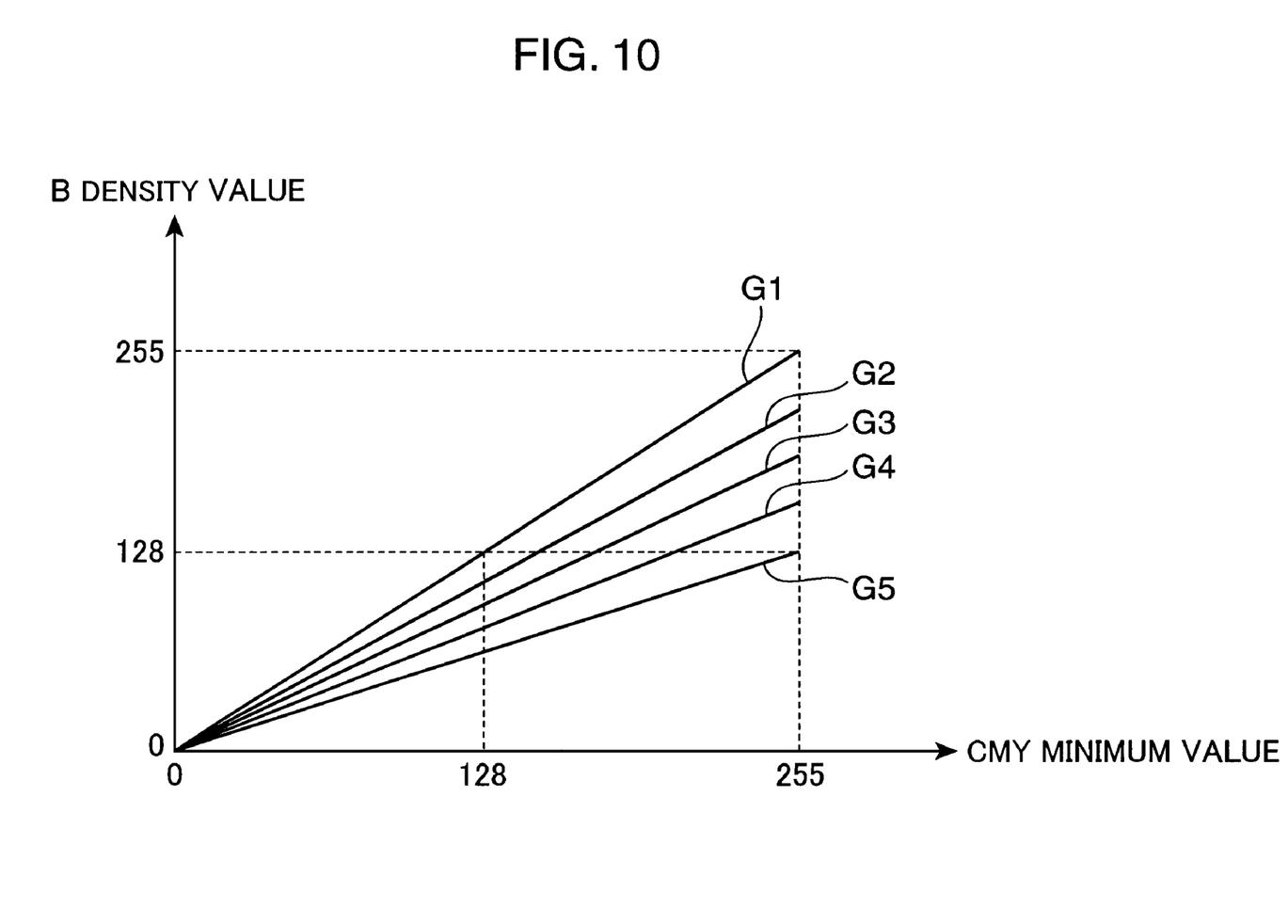
FIG. 10 is a graphical representation, showing an example of the operation of the toner-ratio setting portion shown in FIG. 2.

FIG. 9 is a flow chart, showing an example of the processing for regulating the ratio of a black toner using the toner-ratio setting portion 95. FIG. 10 is a graphical representation, showing the details of the operation of the toner-ratio setting portion 95. In FIG. 10, the horizontal axis indicates a CMY minimum value which is the minimum density value among the density values of the targeted pixels expressed with C, M, Y in the image data whose density is set by the outline emphasis portion 93 and the density change portion 94. The vertical axis indicates the density value of B (or black) when C, M, Y are replaced with B. A graph G1 is a graph which indicates the replacement quantity of B (or black) which is applied to the pixels P1 of the peripheral part of a character. A graph G2 is a graph which indicates the replacement quantity of B (or black) which is applied to achromatic pixels in the pixels P2 adjacent to the character's peripheral part, in other words, in the position a distance of one pixel apart from the character's peripheral part. A graph G3 is a graph which indicates the replacement quantity of B (or black) which is applied to achromatic pixels in the pixels P3 in the position a distance of two pixels apart from the character's peripheral part. A graph G4 is a graph which indicates the replacement quantity of B (or black) which is applied to achromatic pixels in the pixels P4 in the position a distance of three pixels apart from the character's peripheral part. A graph G5 is a graph which indicates the replacement quantity of B (or black) which is applied to the pixels other than the pixels P1 to P4 and chromatic pixels.

For each targeted pixel in the image data whose density is set by the outline emphasis portion 93 and the density change portion 94, the following processing is executed. Specifically, the toner-ratio setting portion 95 confirms whether or not a targeted pixel corresponds to any of the pixels P1 to P4 (in a step S21). If it is equivalent to any one (YES at the step S21), then further, it confirms whether or not this targeted pixel is achromatic (in a step S22). If it is achromatic (YES at the step S22), the processing shifts to a step S23.

Next, in the step S23, if the targeted pixel is the pixel P1 corresponding to the character's peripheral part, the toner-ratio setting portion 95 sets the replacement quantity of B based on the graph G1 shown in FIG. 10 (in a step S23). The graph G1 represents the case where an image is formed when the ratio at which C, M, Y are replaced with B comes to the maximum, in short, using the black toner alone (i.e., the black toner which accounts for 100 percent). For example, if the targeted pixel's density value is C:255, M:255, Y:255 (in the step S23, each density value of C, M, Y is equal because only an achromatic targeted pixel is processed), then from the graph G1, the density value of B (or black) becomes 255. Thus, 255 is subtracted from C, M, Y, and as a result, the targeted pixel's density value is newly set to B:255, C:0, M:0, Y:0. Then, it is stored in the image memory 97. Besides, for example, if the targeted pixel's density value is C:128, M:128, Y:128, then from the graph G1, the density value of B (or black) becomes 128. Thus, 128 is subtracted from C, M, Y, and as a result, the targeted pixel's density value is newly set to B:128, C:0, M:0, Y:0. Then, it is stored in the image memory 97.

Sequentially, if the targeted pixel is the pixel P2 in the position a distance of one pixel apart from the character's peripheral part, the toner-ratio setting portion 95 sets the replacement quantity of B (or black) based on the graph G2 shown in FIG. 10 (in a step S24). In terms of the graph G2, the ratio at which C, M, Y are replaced with B (or black) is set to be lower than that of the graph G1, for example, 87.5 percent of the graph G1. Thereby, for example, if the targeted pixel's density value is C:255, M:255, Y:255, then from the graph G2, the density value of B (or black) becomes 223. Thus, 223 is subtracted from C, M, Y, and as a result, the targeted pixel's density value is newly set to B:223, C:32, M:32, Y:32. Then, it is stored in the image memory 97. Besides, for example, if the targeted pixel's density value is C:128, M:128, Y:128, then from the graph G2, the density value of B becomes 112. Thus, 112 is subtracted from C, M, Y, and as a result, the targeted pixel's density value is newly set to B:112, C:16, M:16, Y:16. Then, it is stored in the image memory 97.

Next, if the targeted pixel is the pixel P3 in the position a distance of two pixels apart from the character's peripheral part, the toner-ratio setting portion 95 sets the replacement quantity of B (or black) based on the graph G3 shown in FIG. 10 (in a step S25). In terms of the graph G3, the ratio at which C, M, Y are replaced with B (or black) is set to be lower than that of the graph G2, for example, 75.0 percent of the graph G1. Thereby, for example, if the targeted pixel's density value is C:255, M:255, Y:255, then from the graph G3, the density value of B (or black) becomes 191. Thus, 191 is subtracted from C, M, Y, and as a result, the targeted pixel's density value is newly set to B:191, C:64, M:64, Y:64. Then, it is stored in the image memory 97. Besides, for example, if the targeted pixel's density value is C:128, M:128, Y:128, then from the graph G3, the density value of B (or black) becomes 96. Thus, 96 is subtracted from C, M, Y, and as a result, the targeted pixel's density value is newly set to B:96, C:32, M:32, Y:32. Then, it is stored in the image memory 97.

Similarly, if the targeted pixel is the pixel P4 in the position a distance of three pixels apart from the character's peripheral part, the toner-ratio setting portion 95 sets the replacement quantity of B (or black) based on the graph G4 shown in FIG. 10 (in a step S26). However, the image data shown in FIG. 8 has no pixel equivalent to the pixel P4, and thus, the black-toner ratio regulation processing for achromatic targeted pixels is terminated. Then, the processing moves to a step S11.

As described so far, in the processing of the steps S21 to S26, the ratio of each colored toner is set so that an image is formed using the black toner alone (i.e., the black toner which accounts for 100 percent) in the pixel P1 of the character's peripheral part. This helps enhance the contrast and clarify the character's outline. Besides, in the image data whose density is set by the outline emphasis portion 93 and the density change portion 94, the ratio of each colored toner is set so that the ratio of the black toner in the four colored toners of black, cyan, magenta and yellow decreases gradually within a predetermined three-pixel range from the peripheral part of the character detected by the character-periphery detection portion 92 toward the inside thereof. Therefore, the black toner's ratio is not sharply changed, thus helping restraining the image from looking odd.

In contrast, unless the targeted pixel corresponds to any of the pixels P1 to P4 (NO at the step S21), as well as if it is chromatic (NO at the step S22), then the processing changes over to a step S27. On the basis of the graph G5 shown in FIG. 10, the toner-ratio setting portion 95 sets the replacement quantity of B (or black) (in the step S27). Then the processing shifts to the step S11. In terms of the graph G5, the ratio at which C, M, Y are replaced with B (or black) is set to be lower than that of the graph G4, for example, 50.0 percent (i.e., the first ratio) of the graph G1. Thereby, for example, if the targeted pixel's density value is C:255, M:255, Y:255, then from the graph G5, the density value of B (or black) becomes 128. Thus, 128 is subtracted from C, M, Y, and as a result, the targeted pixel's density value is newly set to B:128, C:127, M:127, Y:127. Then, it is stored in the image memory 97. Besides, for example, if the targeted pixel's density value is C:128, M:128, Y:128, then from the graph G5, the density value of B becomes 64. Thus, 64 is subtracted from C, M, Y, and as a result, the targeted pixel's density value is newly set to B:64, C:64, M:64, Y:64. Then, it is stored in the image memory 97.

Hence, the case where the targeted pixel does not correspond to any of the pixels P1 to P4 is equivalent to, in other words, the case where the targeted pixel is a pixel outside of the character, or the case where the targeted pixel is a pixel in the position a distance of four or more pixels apart from the character's peripheral part. Thus, in such a pixel which expresses an image other than the character, or such a non-segmented image part of the thick character, the ratio of the black toner is set to a low percent. Thereby, the image can be restrained from being dry and brittle, thus improving the image's quality.

In addition, in the case where the targeted pixel is chromatic, if the ratio of the black toner is high, its color may be a color stained with black to lower the image's quality. However, in the processing of the steps S22 and S27, if it is chromatic, then on the basis of the graph G5 set in advance, the density value of each color is set so that the ratio of the black toner is reduced. Therefore, in the case of a chromatic color, the color can be kept from being a color stained with black, thus restraining the image's quality from deteriorating. Furthermore, if the targeted pixel is chromatic, the density values of C, M, Y are different from each other. For example, in the case of C:128, M:64, Y:32, then B:16 is set from the graph G5 on the basis of Y:32 as the lowest density. Thus, the targeted pixel's density value is newly set to B:16, C:112, M:48, Y:16 and is stored in the image memory 97. Thereby, the ratio of the black toner is set low in the case of a chromatic color, so that the color can be kept from being a color stained with black, thus restraining the image's quality from deteriorating.

Next, in the step S11, the density is regulated by the outline emphasis portion 93 or the density change portion 94. Then, the ratio of each colored toner is regulated by the toner-ratio setting portion 95. On the basis of the image data stored in the image memory 97, the image is formed on a sheet of recording paper by the image formation portion 32. Therefore, the character's contrast can be enhanced, thus making the character more visible. At the same time, even if the character is written in a bold stroke, the change in the density or the variation in the ratio of the black toner can be smoothed. This makes it possible to restrain the image from looking unnatural.

The above described image forming apparatus comprises: an image acquisition portion which acquires image data on an image including a character; a character-periphery detection portion which detects the peripheral part of the character in the image data acquired by the image acquisition portion; an outline emphasis portion which sets the density of the image data acquired by the image acquisition portion, so that the density of the peripheral part of the character detected by the character-periphery detection portion becomes higher than the density indicated by this image data; a density change portion which sets the density of the image data so that this density gradually becomes lower from the peripheral part of the character detected by the character-periphery detection portion toward the inside thereof; and an image formation portion which forms an image on a sheet of recording paper on the basis of the image data whose density is set by the outline emphasis portion and the density change portion.

In this image forming apparatus, the image acquisition portion acquires image data on an image including a character, and the character-periphery detection portion detects the peripheral part of the character in the image data. Then, the outline emphasis portion sets the density of the image data so that the density of the peripheral part of the character detected by the character-periphery detection portion becomes higher. Sequentially, the density change portion sets the density of the image data so that this density gradually becomes lower from the peripheral part of the character toward the inside thereof. Further, the image formation portion forms an image on a sheet of recording paper on the basis of the image data whose density is set by the outline emphasis portion and the density change portion. Therefore, the density of the character's peripheral part becomes higher so that it can be emphasized. Simultaneously, the image data's density is changed so that the density gradually becomes lower from the character's peripheral part toward the inside. This helps improve the visibility of the character and restrain it from looking unnatural because of its density difference.

Furthermore, it is preferable that the density change portion lowers the density gradually within the range of a predetermined number of pixels from the peripheral part of the character detected by the character-periphery detection portion toward the inside thereof.

In this image forming apparatus, the range where the density is gradually lowered is limited within the range of a predetermined number of pixels from the character's peripheral part toward the inside. Therefore, the density is not continuously lowered beyond the range of the number of pixels set in advance. This helps restrain a bold-stroke character from looking gradated.

Moreover: the image formation portion may form the image, using four colored toners each of which is black, cyan, magenta and yellow, respectively; and a toner-ratio setting portion may be further provided which sets the ratio of each colored toner so that the ratio of the black toner in the four colored toners decreases gradually from the peripheral part of the character detected by the character-periphery detection portion toward the inside thereof, on the basis of the image data whose density is set by the outline emphasis portion and the density change portion.

According to this configuration, the toner-ratio setting portion sets the ratio of each colored toner so that the ratio of the black toner in the four colored toners decreases gradually from the character's peripheral part toward the inside, on the basis of the image data whose density is set by the outline emphasis portion and the density change portion. Therefore, the character's peripheral part has the highest ratio of the black toner to emphasize the contrast. Besides, the ratio of the toners of cyan, magenta and yellow is gradually increased from the character's peripheral part toward the inside, so that the quality of a character image looks better.

In addition, it is desirable that the toner-ratio setting portion set the ratio of the black toner to a predetermined first ratio on the inside beyond the range of a predetermined number of pixels from the peripheral part of the character detected by the character-periphery detection portion toward the inside thereof.

In this image forming apparatus, the inside beyond the range of a predetermined number of pixels from the character's peripheral part toward the inside is uniform at the first ratio which is lower than the black-toner ratio of the peripheral part. This helps restrain the image from looking irregular because the black toner's ratio is continuously changed.

Furthermore, it is preferable that: each pixel of the image data be expressed at a density value which indicates the density of each of cyan, magenta and yellow; and the toner-ratio setting portion further set the ratio of the black toner of each pixel, so that the ratio of the black toner increases as the density value of the lowest density color of the cyan, magenta and yellow increases.

In this image forming apparatus, in a chromatic pixel, the ratio of the black toner increases as the density value of the lowest density color of cyan, magenta and yellow increases. Therefore, the higher the image's chroma becomes, the lower the black toner's ratio will be. As a result, its color can be kept from being a color stained with black, thus restraining the image's quality from deteriorating.

Moreover, it is desirable that the toner-ratio setting portion set the ratio so that the ratio of the black toner becomes 100 percent in the peripheral part of the character detected by the character-periphery detection portion.

In this image forming apparatus, in the character's peripheral part, the image is formed using the black toner alone. This helps emphasize the character's contrast.

This application is based on Japanese patent application serial No. 2006-150894, filed in Japan Patent Office on May 31, 2006, the contents of which are hereby incorporated by reference.

Although the present invention has been fully described by way of example with reference to the accompanied drawings, it is to be understood that various changes and modifications will be apparent to those skilled in the art. Therefore, unless otherwise such changes and modifications depart from the scope of the present invention hereinafter defined, they should be construed as being included therein.

What is claimed is:
1. An image forming apparatus, comprising:
an image acquisition portion which acquires image data on an image including a character;

a character-periphery detection portion which detects a peripheral part of the character in the image data acquired by the image acquisition portion;

an outline emphasis portion which sets the density of an image data acquired by the image acquisition portion, so that the density of the peripheral part of the character detected by the character-periphery detection portion becomes higher than the density indicated by this image data;

a density change portion which sets the density of the image data so that this density gradually becomes lower from the peripheral part of the character detected by the character-periphery detection portion toward an inside thereof;

an image formation portion which forms an image on a sheet of recording paper on the basis of the image data whose density is set by the outline emphasis portion and the density change portion, the image forming portion forming the image using four colored toners of black, cyan, magenta and yellow, respectively; and a toner-ratio setting portion that sets a ratio of each colored toner so that the ratio of the black toner decreases in increments, each increment being defined by a selected number of pixels, from the peripheral part of the character detected by the character-periphery detection portion toward the inside thereof, on the basis of the image data whose density is set by the outline emphasis portion and the density change portion.

2. The image forming apparatus according to claim 1, wherein the density change portion lowers the density in increments within a range of a predetermined number of pixels from the peripheral part of the character detected by the character-periphery detection portion toward the inside thereof.

3. The image forming apparatus according to claim 1, wherein the toner-ratio setting portion sets the ratio of the black toner to a predetermined first ratio on the inside beyond a range of a predetermined number of pixels from the peripheral part of the character detected by the character-periphery detection portion toward the inside thereof.

4. The image forming apparatus according to claim 1, wherein:
each pixel of the image data is expressed at a density value which indicates the density of each of cyan, magenta and yellow; and
the toner-ratio setting portion further sets the ratio of the black toner of each pixel, so that the ratio of the black toner increases as the density value of the lowest density color of the cyan, magenta and yellow increases.

5. The image forming apparatus according to claim 1, wherein the toner-ratio setting portion sets the ratio so that the ratio of the black toner becomes 100 percent in the peripheral part of the character detected by the character-periphery detection portion.

6. An image forming apparatus, comprising:
an image acquisition portion that acquires image data on an image including a character;
a character-periphery detection portion that detects a peripheral part of the character in the image data acquired by the image acquisition portion;
an outline emphasis portion that sets a density of the image data acquired by the image acquisition portion, so that the density of the peripheral part of the character detected by the character-periphery detection portion becomes higher than the density indicated by this image data;
a density change portion that sets the density of the image data so that this density gradually becomes lower from the peripheral part of the character detected by the character-periphery detection portion toward an inside thereof;
an image formation portion which forms an image on a sheet of recording paper on the basis of the image data whose density is set by the outline emphasis portion and the density change portion, the image formation portion forming the image, using four colored toners of black, cyan, magenta and yellow, respectively; and
a toner-ratio setting portion that sets a ratio of each colored toner so that the ratio of the black toner decreases gradually from the peripheral part of the character detected by the character-periphery detection portion toward the inside thereof, on the basis of the image data whose density is set by the outline emphasis portion and the density change portion, wherein
each pixel of the image data is expressed at a density value that indicates the density of each of cyan, magenta and yellow; and
the toner-ratio setting portion further sets the ratio of the black toner of each pixel, so that the ratio of the black toner increases as the density value of the lowest density color of the cyan, magenta and yellow increases.

7. An image forming apparatus, comprising:
an image acquisition portion that acquires image data on an image including a character;
a character-periphery detection portion that detects the peripheral part of the character in the image data acquired by the image acquisition portion;
an outline emphasis portion that sets the density of the image data acquired by the image acquisition portion, so that the density of the peripheral part of the character detected by the character-periphery detection portion becomes higher than the density indicated by this image data;
a density change portion that changes the density of the image data inwardly of the peripheral part so that this density gradually becomes lower from the peripheral part of the character detected by the character-periphery detection portion toward the inside thereof; and
an image formation portion that forms an image on a sheet of recording paper on the basis of the image data whose density is set by the outline emphasis portion and the density change portion.

8. The image forming apparatus of claim 7, wherein the density change portion changes the density in increments inwardly of the peripheral part, each increment being defined by a selected number of pixels.

* * * * *